US009846719B2

(12) United States Patent
Labuda

(10) Patent No.: US 9,846,719 B2
(45) Date of Patent: Dec. 19, 2017

(54) DEPENDENT COMMIT QUEUE FOR A DATABASE

(71) Applicant: Matrixx Software, Inc., Saratoga, CA (US)

(72) Inventor: David Labuda, Hillsborough, CA (US)

(73) Assignee: Matrixx Software, Inc., Saratoga, CA (US)

( * ) Notice: Subject to any disclaimer, the term of this patent is extended or adjusted under 35 U.S.C. 154(b) by 0 days.

(21) Appl. No.: 15/424,541

(22) Filed: Feb. 3, 2017

(65) Prior Publication Data

US 2017/0228419 A1 Aug. 10, 2017

Related U.S. Application Data

(63) Continuation of application No. 15/052,213, filed on Feb. 24, 2016, now Pat. No. 9,600,511, which is a continuation of application No. 13/933,443, filed on Jul. 2, 2013, now Pat. No. 9,305,035, which is a continuation of application No. 12/380,983, filed on Mar. 5, 2009, now Pat. No. 8,504,538.

(51) Int. Cl.
*G06F 17/30* (2006.01)

(52) U.S. Cl.
CPC .. *G06F 17/30377* (2013.01); *G06F 17/30351* (2013.01)

(58) Field of Classification Search
None
See application file for complete search history.

(56) References Cited

U.S. PATENT DOCUMENTS

| | | |
|---|---|---|
| 5,230,073 A | 7/1993 | Gausmann |
| 5,247,648 A | 9/1993 | Watkins |
| 5,263,142 A | 11/1993 | Watkins |
| 5,337,263 A | 8/1994 | Patermaster |
| 5,504,899 A | 4/1996 | Raz |
| 5,555,416 A | 9/1996 | Owens |
| 5,581,753 A | 12/1996 | Terry |
| 5,983,225 A | 11/1999 | Anfindsen |
| 6,047,267 A | 4/2000 | Owens |
| 6,047,284 A | 4/2000 | Owens |
| 6,058,388 A | 5/2000 | Molloy |
| 6,092,055 A | 7/2000 | Owens |
| 6,321,236 B1 | 11/2001 | Zollinger |
| 6,480,591 B1 | 11/2002 | Penfield |
| 6,529,915 B1 | 3/2003 | Owens |
| 6,594,660 B1 | 7/2003 | Berkowitz |
| 7,051,028 B2 | 5/2006 | Shi |
| 7,089,262 B2 | 8/2006 | Owens |
| 7,092,768 B1 | 8/2006 | Labuda |
| 7,233,918 B1 | 6/2007 | Ye |

(Continued)

OTHER PUBLICATIONS

State of New Jersey—Schedule A—Wireless Telephone Services', 2007, State of New Jersey.

(Continued)

*Primary Examiner* — Bai D. Vu
(74) *Attorney, Agent, or Firm* — Van Pelt, Yi & James LLP

(57) ABSTRACT

A database comprises a database interface and a database updater. The database interface receives a first set of information and a second set of information to be updated in the database. The database updater updates a second set of information in the database based at least in part on a condition that a first set of information in the database has been previously updated.

19 Claims, 10 Drawing Sheets

(56) References Cited

U.S. PATENT DOCUMENTS

| | | |
|---|---|---|
| 7,257,611 B1 | 8/2007 | Shankar |
| 7,584,174 B2 | 9/2009 | Blanco |
| 7,624,108 B1 | 11/2009 | Goldberg |
| 7,756,763 B1 | 7/2010 | Owens |
| 8,074,030 B1 | 12/2011 | Moir |
| 2002/0138706 A1 | 9/2002 | Hugly |
| 2003/0204514 A1 | 10/2003 | Owens |
| 2003/0236786 A1 | 12/2003 | Shi |
| 2004/0133591 A1 | 7/2004 | Holenstein |
| 2004/0199519 A1 | 10/2004 | Gu |
| 2006/0190478 A1 | 8/2006 | Owens |
| 2006/0248010 A1 | 11/2006 | Krishnamoorthy |
| 2007/0043657 A1 | 2/2007 | Koenigsman |
| 2007/0091874 A1 | 4/2007 | Rockel |
| 2007/0118472 A1 | 5/2007 | Allen-Rouman |
| 2007/0198283 A1 | 8/2007 | Labuda |
| 2007/0288367 A1 | 12/2007 | Krishnamoorthy |
| 2007/0288368 A1 | 12/2007 | Krishnamoorthy |
| 2008/0010379 A1 | 1/2008 | Zhao |
| 2008/0033873 A1 | 2/2008 | Krishnamoorthy |
| 2008/0033874 A1 | 2/2008 | Krishnamoorthy |
| 2008/0040267 A1 | 2/2008 | Krishnamoorthy |
| 2008/0133608 A1 | 6/2008 | Brown |
| 2008/0201712 A1 | 8/2008 | Nottingham |
| 2009/0172305 A1 | 7/2009 | Shpeisman |
| 2009/0177658 A1 | 7/2009 | Brantner |
| 2010/0138842 A1 | 6/2010 | Balko |
| 2010/0228705 A1 | 9/2010 | Labuda |
| 2010/0228706 A1 | 9/2010 | Labuda |
| 2011/0171948 A1 | 7/2011 | Labuda |
| 2011/0238641 A1 | 9/2011 | Labuda |
| 2012/0039450 A1 | 2/2012 | Labuda |
| 2012/0084253 A1 | 4/2012 | Labuda |
| 2013/0013576 A1 | 1/2013 | Labuda |
| 2013/0138605 A1 | 5/2013 | Labuda |
| 2014/0012807 A1 | 1/2014 | Labuda |
| 2014/0086104 A1 | 3/2014 | Labuda et al. |
| 2014/0164340 A1 | 6/2014 | Labuda et al. |

OTHER PUBLICATIONS

Chamberlin, Don, 'A Complete Guide to DB2 Universal Database', Complete Guide to DB2 Universal Database, XX, XX, Jan. 1, 1998 (Jan. 1, 1998), pp. I-II, 389, XP002346940, pp. 393-394, p. 411.

Elmasri R. and Navathe SB. Fundamentals of Database Systems. Pearson Education, Inc.: Jul. 23, 2003, pp. 551-635.

Harder et al.: 'Datenbanksysteme Konzepte und Techniken der Implementierung, Weitere Verfahrensklassen und Optimierungen', Dec. 31, 2001 (Dec. 31, 2001), Datenbanksysteme : Konzepte uno Techniken Der Implementierung; MIT 14 Tabellen, Springer, DE, pp. 439-443, XP002682895, ISBN: 978-3-540-42133-7 the whole document.

Herlihy et al. "Transactional Boosting: A Methodology for Highly-Concurrent Transactional Objects", 2008, ACM.

R. Yoo, "Adaptive Transaction Scheduling for Transactional Memory Systems", May 2008, Georgia Institute of Technology.

DEPENDENT COMMIT QUEUE FOR A DATABASE

CROSS REFERENCE TO OTHER APPLICATIONS

This application is a continuation of U.S. patent application Ser. No. 15/052,213, now U.S. Pat. No. 9,600,511, entitled DEPENDENT COMMIT QUEUE FOR A DATABASE filed Feb. 24, 2016 which is incorporated herein by reference for all purposes, which is a continuation of U.S. patent application Ser. No. 13/933,443, now U.S. Pat. No. 9,305,035, entitled DEPENDENT COMMIT QUEUE FOR A DATABASE filed Jul. 2, 2013 which is incorporated herein by reference for all purposes, which is a is a continuation of U.S. patent application Ser. No. 12/380,983, now U.S. Pat. No. 8,504,538, entitled DEPENDENT COMMIT QUEUE FOR A DATABASE filed Mar. 5, 2009 which is incorporated herein by reference for all purposes.

BACKGROUND OF THE INVENTION

Database systems contain information being accessed for both reading and writing. In some cases, an application manipulates data based on one or more database entries. In order to prevent creating data inconsistencies, a database will lock access to database entries during the time that an application is manipulating data. However, locking access to database entries during the time that an application is manipulating one or more database entries blocks other applications from using the locked entries, creates overheads to the database system in order to indicate what is locked, how long it is locked, and what to queue up for accessing the database entries after the entries become unlocked. In some cases when the number and frequency of accesses is high or when the amount of time that an application requires a lock is long, a database system can become unacceptably slow in its response to requests because requests are queued or checking to determine if access is allowable becomes too time consuming.

BRIEF DESCRIPTION OF THE DRAWINGS

Various embodiments of the invention are disclosed in the following detailed description and the accompanying drawings.

DETAILED DESCRIPTION

Figure 1:
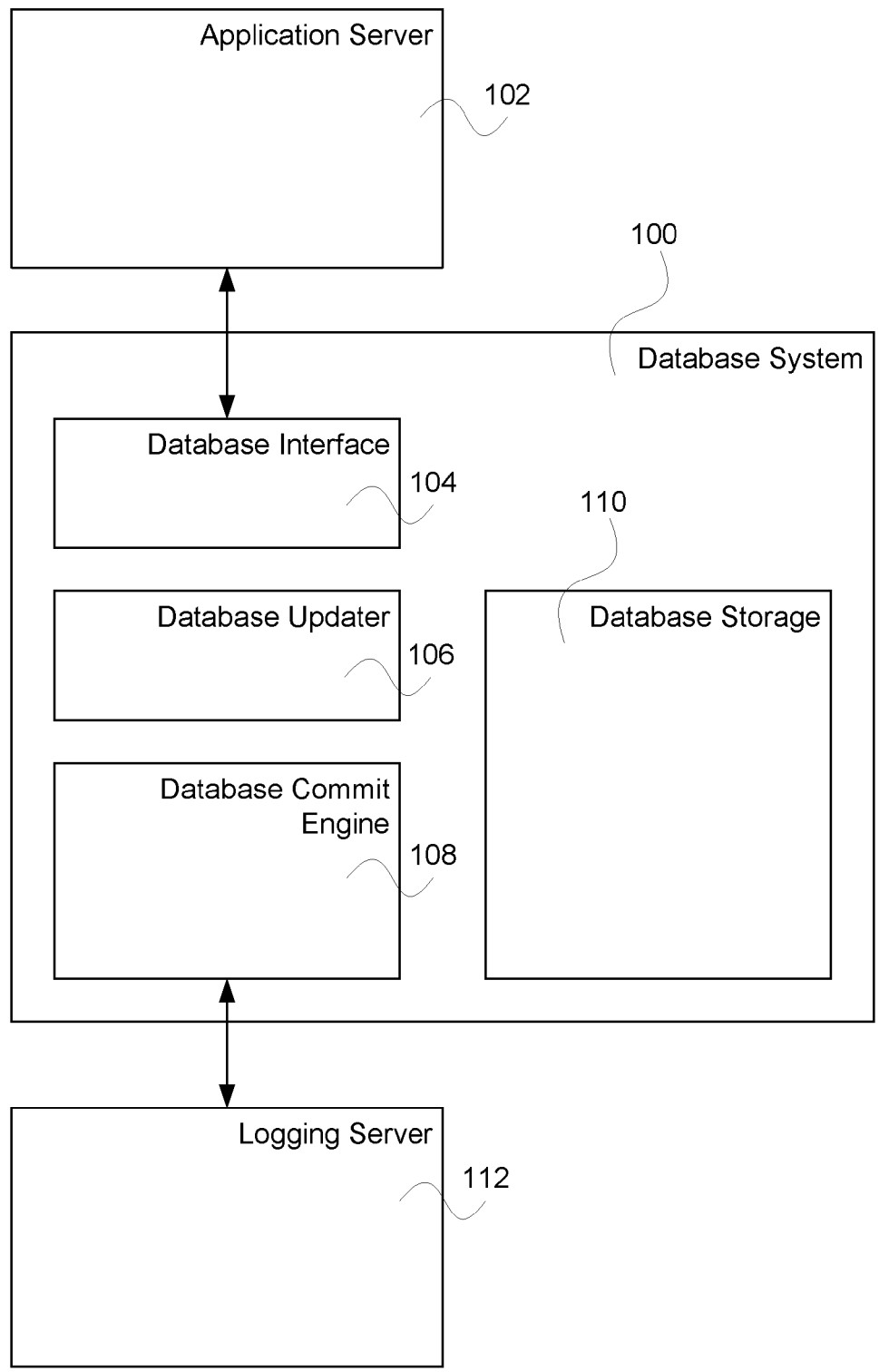
FIG. 1 is a block diagram illustrating an embodiment of a database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A conditional commit for data in a database is disclosed. The database does not lock for the time during which an application manipulates data. The database can read, write, or otherwise access data in the database even when other operations are active. A conditional write to the database is enabled to allow an application to write to the database in the event that one or more conditions on database entries are met. For example, a write to a database entry is dependent on another database entry's value having stayed the same, be above a certain value, having not changed more than a certain amount since a prior reading of a value, be below a certain value, having changed more than a certain amount since a prior reading of a value, having been written (or updated) since a prior reading, having been not written (or not updated) since a prior specific reading, having been read or not read since a prior reading, having been written or not written since a prior specific writing, having been read or not read since a prior writing, or any other appropriate condition. A database can then reduce, if not eliminate, overheads associated with access locking. A situation where multiple accesses to a data entry may or may not impact an application's interaction with a database data entry are handled using the conditional write. In the event that a database entry does not satisfy the condition associated with the conditional write, then the application can restart the process or calculation for the associated database entries. For a database where the probability of a problem situation arising from inappropriate access of database entries by applications is low, then database overheads for access locking are reduced or eliminated for all database interactions in favor of handling a conditional write command only in the low probability event that a condition is not met. The conditional commit technology also enables multiple system database architectures where operation (e.g., previously locking operations) across databases is required. The shorter the locking, or lack of locking, for multiple system architectures the less likely that performance issues will arise due to the tracking and synchronization requirements of the multi-platform locks.

In some embodiments, the conditional commit enables faster processing of a database system. Typically, database systems ensure that commits are made without any corruption to data involved in the commit by locking the involved data. The overhead required for this slows processing by using processing cycles to track the involved data and queue any processes that want to access involved data. These overheads can, in systems with a high number of transactions to process, drive the system to a halt. Eliminating the overheads and allowing some potential corruption of data can speed the system. Corruption of data is detected using the conditions placed on the commits. The effects of the corruption of data can be corrected, if necessary (e.g., if the condition is not met), by resubmitting the transaction that resulted in the commit. For scenarios, where corruption occurrences are very rare, the system can process transactions faster and higher transaction volumes.

In various embodiments, a database has a read lock (e.g., no access is allowed to each of the multiple items for other read/write requests during a requested read of the multiple items) or has no read lock (e.g., access is allowed to any item for other read/write requests during a read request for multiple items).

A dependent commit queue for a database is disclosed. A database entry is written to and is submitted to a permanent log for entry with the condition that it is committed after a prior submitted database entry write (i.e., a prior submission). In the event that the prior submitted database entry fails—for example, due to equipment failure, then the subsequent submission that is dependent on the prior submission, is removed from the permanent log queue and not entered in the permanent log. If there are multiple dependent entries that have been submitted dependent on a prior submission, then all multiple dependent entries are removed from the log queue and not entered in the permanent log. The multiple entries are either resubmitted or indicated to an application or to the database handler for the entries as not having been entered into the log. In some embodiments, these entries that have not been entered into the log are either reprocessed and resubmitted for log entry or are flagged as being in an error state.

In various embodiments, data in the database comprises numbers, strings, dates, times, bytes, floating point values, or any other appropriate data.

FIG. 1 is a block diagram illustrating an embodiment of a database system. In the example shown, database system 100 interacts with application server 102. Application server 102 requests access to database entries—for example, a read or a write to one or more cells in a database. Application server 102 receives output from database system 100. Database system 100 includes database interface 104, database updater 106, database commit engine 108, and database storage 110. Database system 100 receives input and provides output using database interface 104. Database updater 106 updates entries in the database storage 110. Database commit engine 108 commits database entries in database storage 110 to logging server 112. Logging server 112 logs database entries so that the database entries can be retrieved in the event that database entries in database storage 110 become unavailable (e.g., the database entries have changed, are lost due to power loss, etc.). Database updater 106 conditionally updates a database entry. In various embodiments, database updater 106 updates a database entry based at least in part on a condition, where the condition is one of the following: if a database entry is equal to, greater than, greater than or equal to, less than, less than or equal to a predetermined value, if the database entry has changed or not, has been read or not, has been accessed or not, or any other appropriate condition.

In some embodiments, application server 102, database system 100 and logging server 112 each comprise a processor for executing instructions stored in a memory. In some embodiments, database system 100 comprises one or more processors for executing instructions associated with database interface 104, database updater 106, database commit engine 108, and database storage 110. In various embodiments, database storage 110 comprises an internal hard drive, an external hard drive, a hard drive array (e.g., a redundant array), a semiconductor memory system, a network attached storage device, or any other appropriate storage. In various embodiments, database system 100, application server 102, logging server 112 comprise one hardware system or multiple hardware systems or any other appropriate actual or virtual combination of systems with one or more dedicated or shared processors for processing data stored in associated storage devices (e.g., read only, random access memory or storage devices) and executing memory-stored instructions to achieve the desired functionality of the systems.

Figure 2:
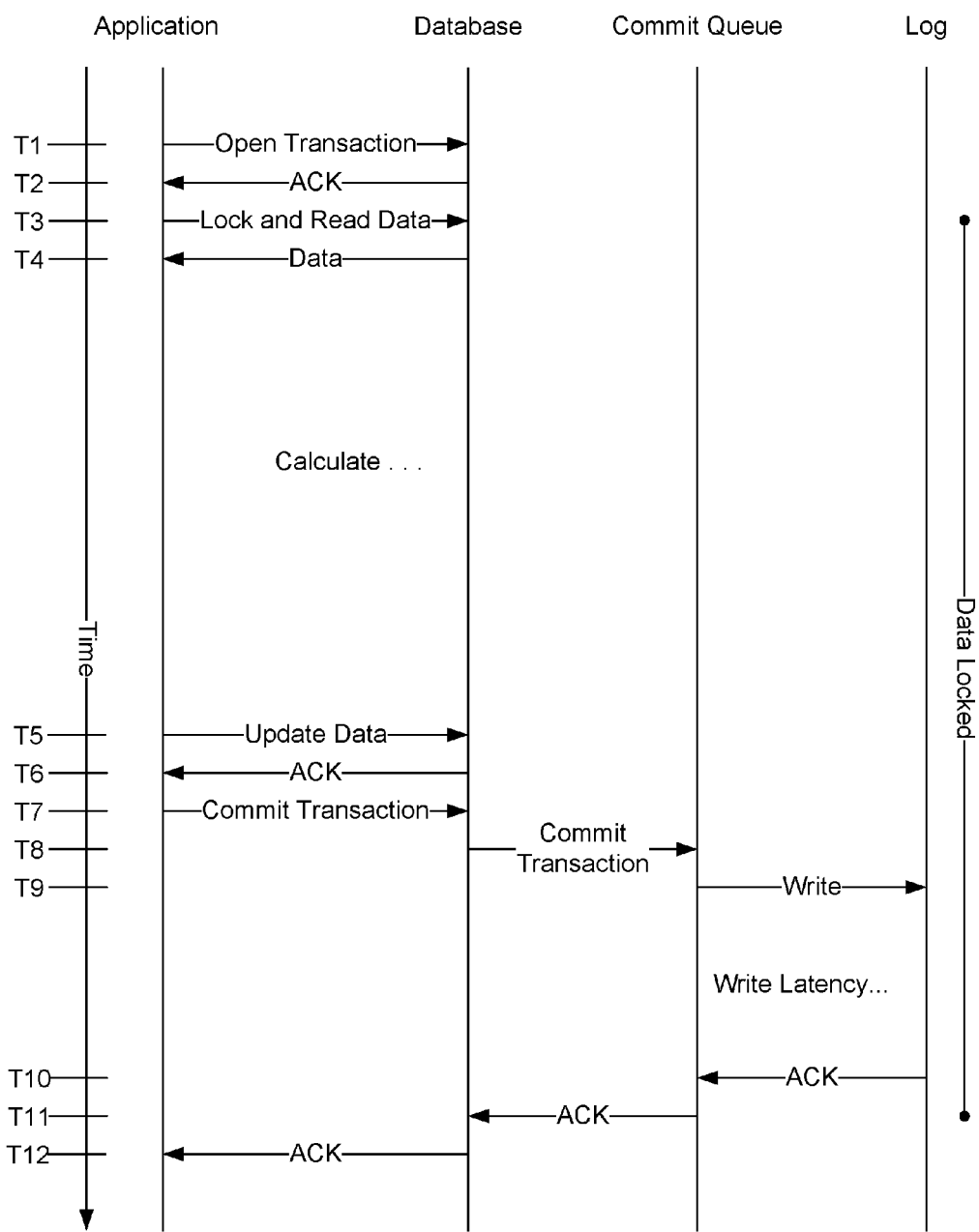
FIG. 2 is a diagram illustrating an embodiment of a database lock.

FIG. 2 is a diagram illustrating an embodiment of a database lock. In the example shown, an application of an application server (e.g., application server 102 of FIG. 1) interacts with a database of a database system (e.g., database system 100 of FIG. 1). At T1, the application sends an open transaction instruction to the database. At T2, the database sends an acknowledgement (e.g., an ACK) to the application. At T3, the application sends a lock and read data instruction to the database. At T4, the database sends data to the application. After reading data, the application spends time calculating. At T5, the application sends an update data instruction to the database. At T6, the database sends an acknowledgement to the application. At T7, the application sends a commit transaction instruction to the database. At T8, the database sends a commit transaction instruction to the commit queue. At T9, the commit queue sends a write instruction to a log. After receiving the write instruction, the log writes the data to a memory (e.g., a magnetic hard drive or other storage device). At T10, the log sends an acknowledgement that the data has been written to a log. At T11, the commit queue sends an acknowledgement to the database. At T12, the database sends an acknowledgement back to the application after the commit has been committed to a log (e.g., permanent storage). In a database system that ensures that data entries are not allowed to be changed in a way that would invalidate a calculation involving the transaction associated data, a lock is placed on appropriate database entries. In some embodiments, the data read during the transaction is locked. Locking secures exclusive access to data for a time period encompassing an external, generally slow, event such as an application computation or a physical disk write. In various embodiments, the data updated is the same as or a portion of the data read, is different from the data read, is partly data that is read and partly data that is not read, or any other appropriate data in the database.

Figure 3:
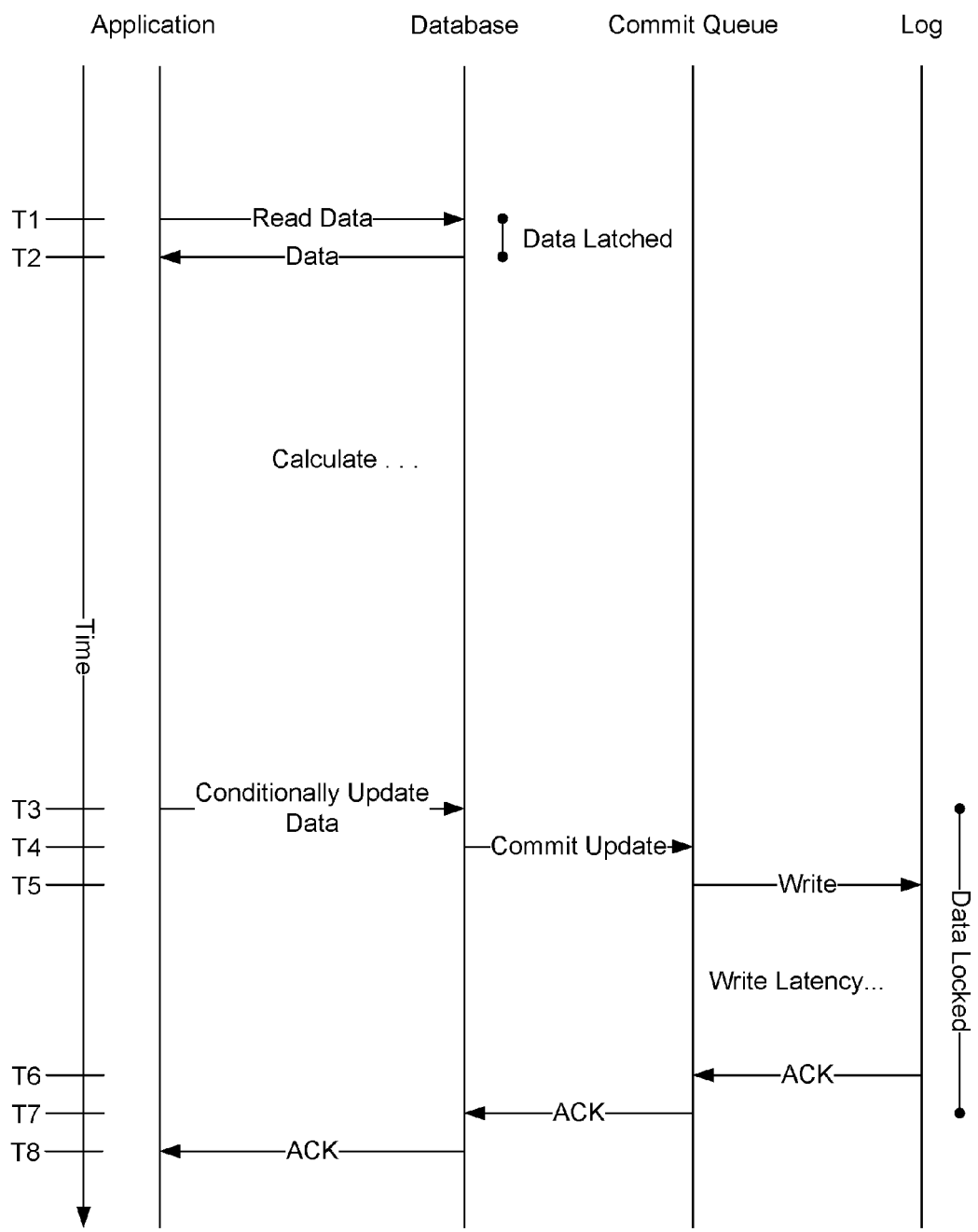
FIG. 3 is a diagram illustrating an embodiment of a commit lock.

FIG. 3 is a diagram illustrating an embodiment of a database lock. In the example shown, an application of an application server (e.g., application server 102 of FIG. 1) interacts with a database of a database system (e.g., database system 100 of FIG. 1). At T1, the application sends a read data instruction to the database. At T2, the database sends data to the application. During the time the database is responding to the read data instruction the data is latched. Latching secures exclusive access to data for an atomic region of computer instructions that contains no external communications or references, and therefore executes at full speed without waiting for completion of any external event. After reading data, the application spends time calculating. At T3, the application sends a conditional update data instruction to the database. At T4, the database sends a commit update instruction to the commit queue. At T5, the commit queue sends a write instruction to a log. After receiving the write instruction, the log writes the data to a memory (e.g., a magnetic hard drive or other storage device). At T6, the log sends an acknowledgement that the data has been written to a log. At T7, the commit queue sends an acknowledgement to the database. At T8, the database sends an acknowledgement back to the application after the commit has been committed to a log (e.g., permanent storage). A conditional update ensures that data entries are not allowed to be updated (e.g., committed to a commit queue) unless one or more conditions is/are met. In some embodiments, a conditional update enables a database system to release data involved with a calculation for other processes to access (e.g., read, write, etc.) by placing conditions on the update. For example, a calculation of an update may result in a change to a value that is acceptable as long as the value has not been written to since a reading of the data for the calculation, has not changed in such a way as to materially affect (e.g., require a change to the calculation method, parameters, etc.) the outcome of the calculation, etc. In various embodiments, the condition comprises a condition that a database entry is more than a lower limit, more than or equal to a lower limit, equal to a predetermined value, equal to another database value, less than or equal to an upper limit value, less than an upper limit value, or any other appropriate condition. In various embodiments, the condition comprises a database value having been written since a specific prior read or time, having been not written since a specific prior read or time, having been read since a specific prior read or time, having been not read since a specific prior read or time, or any of the aforementioned since a specific prior write, or any other appropriate condition.

Figure 4:
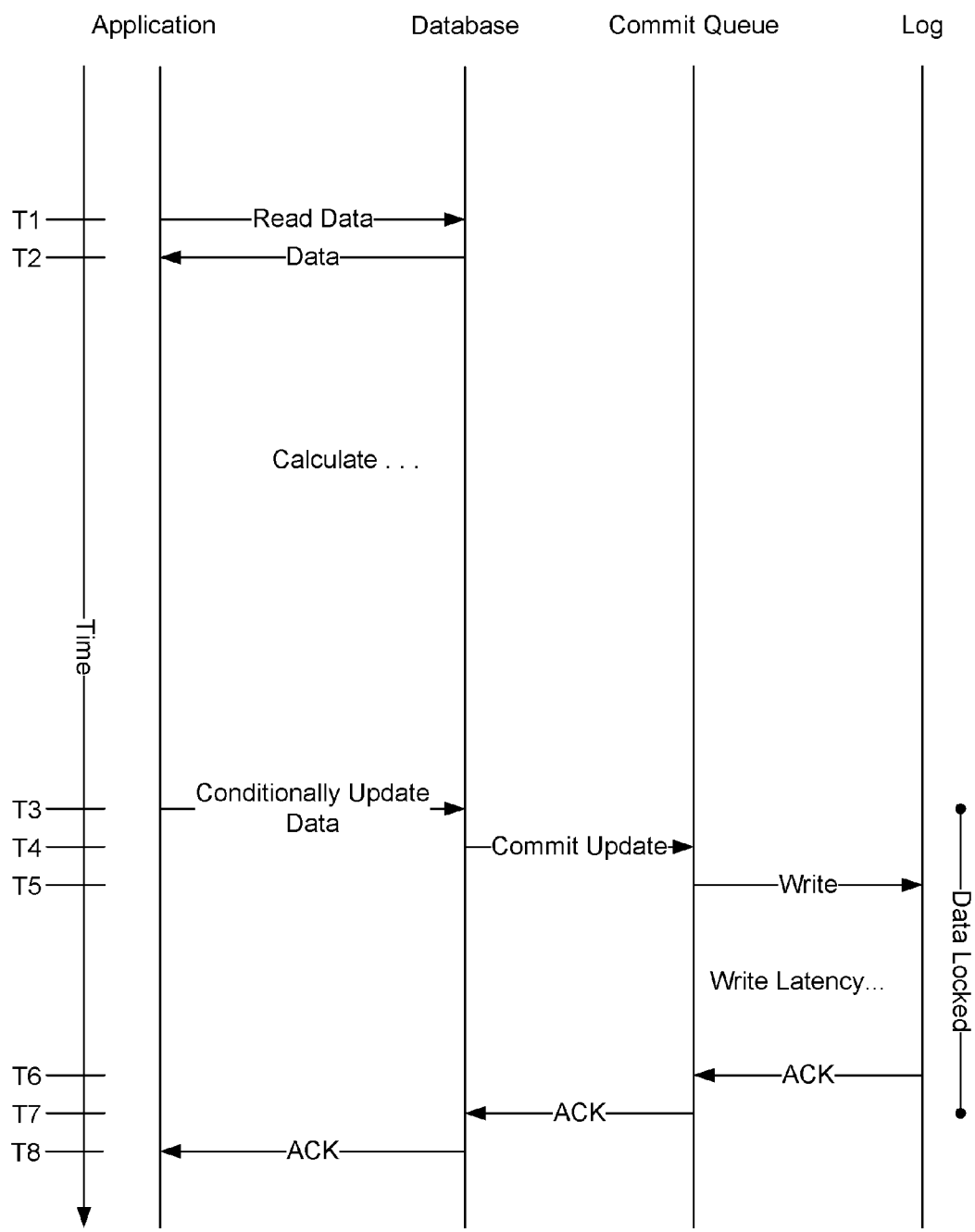
FIG. 4 is a diagram illustrating an embodiment of a commit lock.

FIG. 4 is a diagram illustrating an embodiment of a database lock. In the example shown, an application of an application server (e.g., application server 102 of FIG. 1) interacts with a database of a database system (e.g., database system 100 of FIG. 1). At T1, the application sends a read data instruction to the database. At T2, the database sends data to the application. A read latch is not put in place; For a situation where an inconsistent read occurs, a condition for the updating can be used to ensure that the inconsistent read does not have a material effect on the calculation. After reading data, the application spends time calculating. At T3, the application sends a conditional update data instruction to the database. At T4, the database sends a commit update instruction to the commit queue. At T5, the commit queue sends a write instruction to a log. After receiving the write instruction, the log writes the data to a memory (e.g., a magnetic hard drive or other storage device). At T6, the log sends an acknowledgement that the data has been written to a log. At T7, the commit queue sends an acknowledgement to the database. At T8, the database sends an acknowledge-ment back to the application after the commit has been committed to a log (e.g., permanent storage). A conditional update ensures that data entries are not allowed to be updated (e.g., committed to a commit queue) unless one or more conditions is/are met. In some embodiments, a conditional update enables a database system to release data involved with a calculation for other processes to access (e.g., read, write, etc.) by placing conditions on the update. For example, a calculation of an update may result in a change to a value that is acceptable as long as the value has not been written to since a reading of the data for the calculation, has not changed in such a way as to materially affect (e.g., require a change to the calculation method, parameters, etc.) the outcome of the calculation, etc. In various embodiments, the condition comprises a condition that a database entry is more than a lower limit, more than or equal to a lower limit, equal to a predetermined value, equal to another database value, less than or equal to an upper limit value, less than an upper limit value, or any other appropriate condition. In various embodiments, the condition comprises a database value having been written since a specific prior read or time, having been not written since a specific prior read or time, having been read since a specific prior read or time, having been not read since a specific prior read or time, or any of the aforementioned since a specific prior write, or any other appropriate condition.

Figure 5:
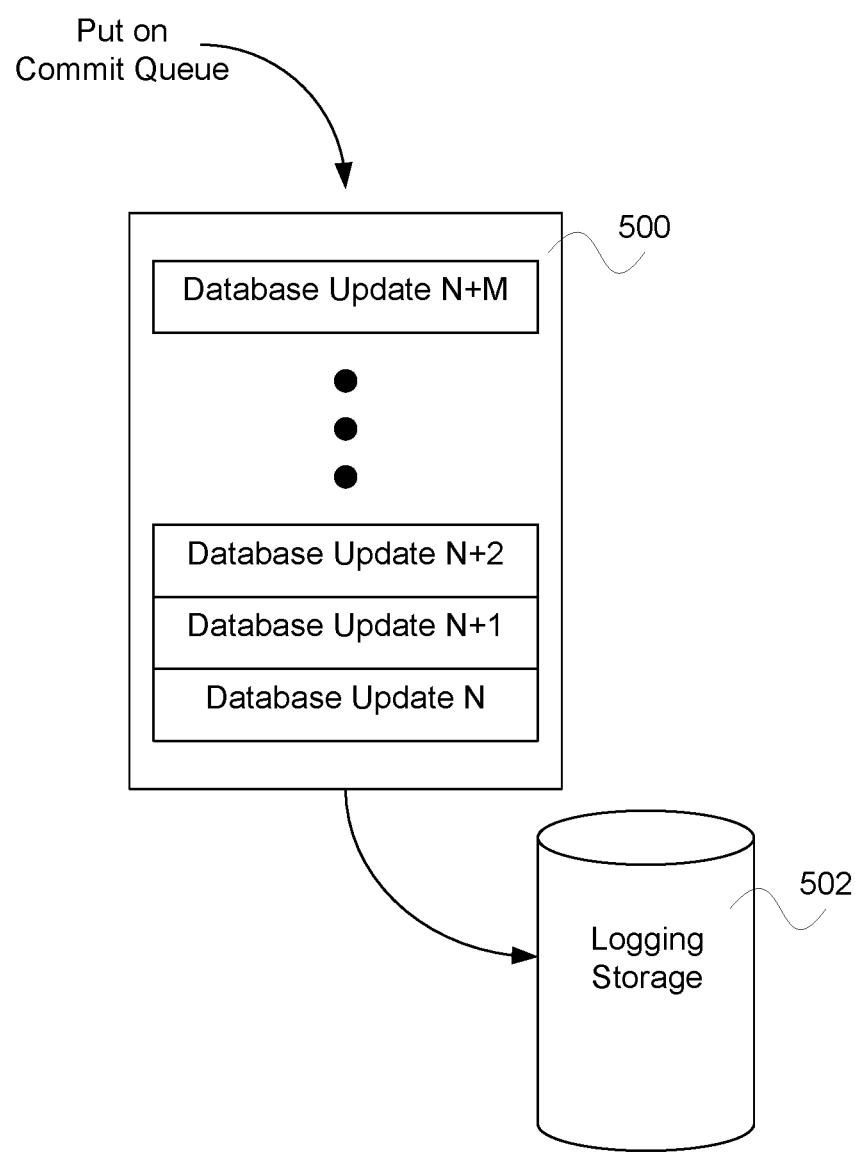
FIG. 5 is a block diagram illustrating an embodiment of a commit queue.

FIG. 5 is a block diagram illustrating an embodiment of a commit queue. In the example shown, a database entry is submitted to commit queue 500 (e.g., database update N+M). An entry waits in the commit queue until it comes to the end of the queue and is committed to (e.g., written to) logging storage 502. For example, database update N+2, database update N+1, and database update N are in the queue almost ready to be written to logging storage 502. In some embodiments, a database update (e.g., database update N+M) is conditionally submitted to commit queue 500 such that the database update is not committed unless a prior database update is also committed (e.g., database update N+2, database update N+1, database update N) or written to logging storage 500. In the event that the condition is not met (e.g., the prior database entry is not committed), then the database update is not committed and is removed from commit queue 500.

Figure 6:
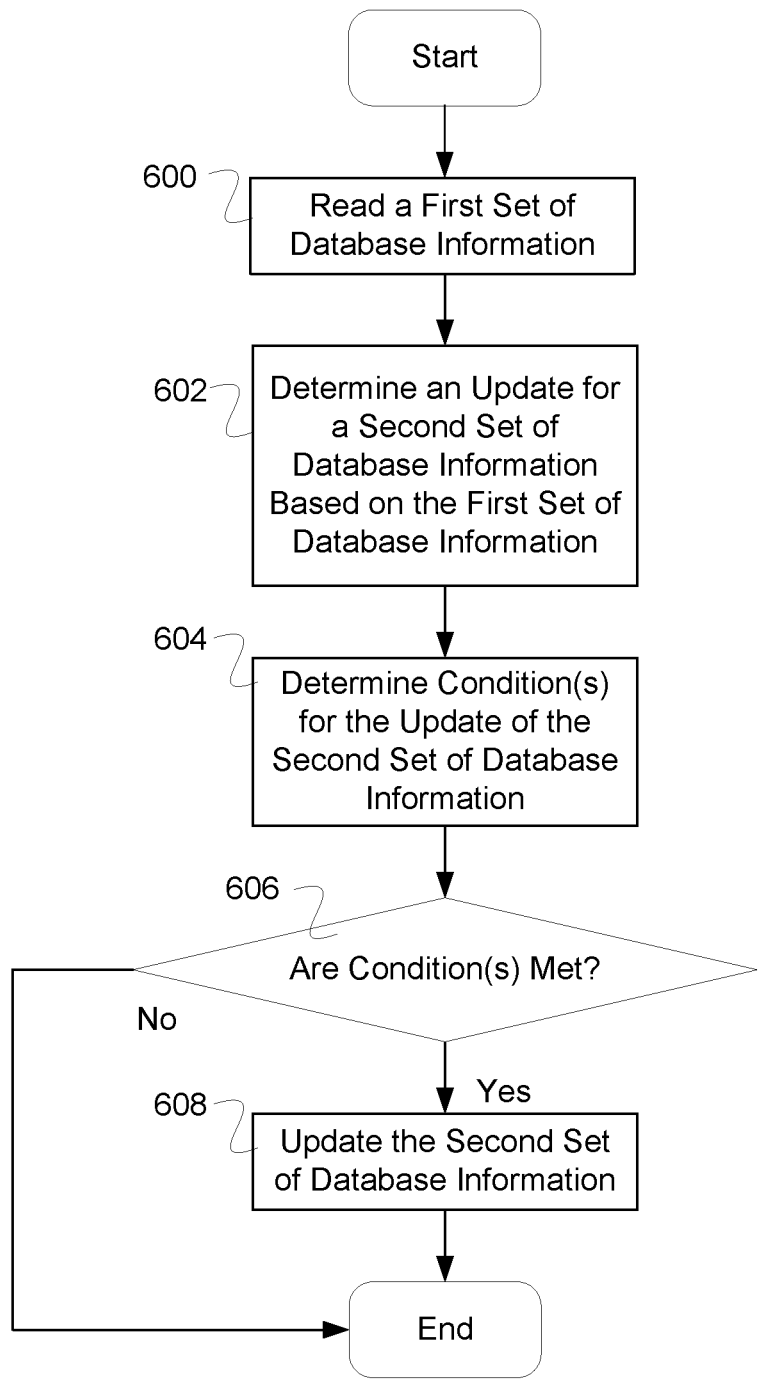
FIG. 6 is a flow diagram illustrating an embodiment of a process for conditionally updating a database.

FIG. 6 is a flow diagram illustrating an embodiment of a process for conditionally updating a database. In the example shown, in 600 a first set of database information is read. In 602, an update for a second set of database information is determined based on the first set of database information. In 604, condition(s) for the update of the second set of database information are determined. In 606, it is determined whether the condition(s) is/are met. In 608, in the event that the condition(s) is/are met, the second set of database information is updated, and the process ends. In the event that the condition(s) is/are not met, the process ends. In some embodiments, data is locked during the updating of the second set of database information.

In some embodiments, read locks are not included in the system architecture. Read locks are included so that reading a data A and a data B to use in a calculation or processing of an event have a consistent view (e.g., time consistent snapshot) of the data in the database. The lock is put there to avoid the following scenario:
  a. Event process 1 reads data A;
  b. Event process 2 updates data A to A' and data B to B';
  c. Event process 1 reads data B';
  d. Event process 1 calculates an update based on A and B';

e. Event process 1 updates data (e.g., data corresponding to A & A', B & B' or other data) based on values A and B' (e.g., an inconsistent view of the data);

In some embodiments, read locks prevent B from changing to B' during a read while a process is processing. This ensures that consistent views of the data (e.g., data A and data B) are relied on in calculating an update. In some embodiments, the update calculated using data A and data B are used to update data A and data B before other processes are allowed to read and/or write data A and data B.

In some embodiments, using a system with a conditional update of data in a database, if a read latch is present, a scenario in one example is the following:
 a. Event process 1 locks data A and data B and reads data A and data B;
 b. Event process 2 attempts to read data A or data B while the above lock is on, but is blocked due to the lock from process 1;
 c. Event process 1 unlocks data A and data B;
 d. Event process 2 locks data A and data B and reads data A and data B;
 e. Event process 2 calculates an update for data A and data B and updates data A to A' and data B to B';
 f. Event process 2 releases locks on data A and data B;
 g. Event process 1 finishes calculation to update data A and data B and conditionally updates data A and data B by checking to see if the condition requirement for A' and B' meet the condition requirements with respect to A and B; if the condition requirements are met data A and data B (now actually A' and B') are updated; if the condition requirements are not met, then event process 1 fails and must be resubmitted;

In some embodiments, using a system with a conditional update of data in a database, if a read latch is not present, a scenario in one example is the following:
 a. Event process 1 reads data A;
 b. Event process 2 reads data A while process 1 is reading, but is not blocked due to a lack of a latch from process 1;
 c. Event process 2 reads data B;
 d. Event process 2 calculates an update for data A and data B and updates data A to A' and data B to B';
 e. Event process 1 reads data B';
 f. Event process 1 finishes calculation to update data A and data B' and conditionally updates data A and data B' by checking to see if the condition requirement for A' and B' meet the condition requirements with respect to A and B'; if the condition requirements are met data A and data B (now actually A' and B') are updated; if the condition requirements are not met, then event process 1 fails and must be resubmitted;

Note that the conditional check in this scenario is actually checking conditions closer to the final state than the previous scenario; in the previous scenario, the updates were calculated using data A and data B and the data had changed to data A' and data B', and in this scenario the updates are calculated using data A and data B' and the data had changed to data A' and data B'. If the condition requirements (e.g., balances are each above 10 minutes) are met for updating the data (e.g., calculating a new balance for phone minutes based on prior balance(s)) then the update is allowed to proceed (e.g., subtracting 3 minutes for a call charge).

In some embodiments, a typical database without a conditional update has an application with multiple parallel processes that read and update a database element (e.g., element A) based on an algorithm. In a situation with two parallel processes (e.g., process P1 and process P2) that are running more or less at the same time, a sequence of example events occurring that access element A are:
 a. P1 opens transaction 1 (TXN1) and locks and reads A;
 b. P2 opens transaction 2 (TXN2) and attempts to lock and read A;
 c. P2 is blocked by the lock on A and is forced to wait;
 d. P1 calculates a new value based on A: A1;
 e. P1 updates A to A1;
 f. P1 commits TXN1, which commits A to A1 and releases the lock on A1;
 g. P2 unblocks and locks and reads A1;
 h. P2 calculates a new value based on A1: A2;
 i. P2 updates A1 to A2; and
 j. P2 commits TXN2, which commits A1 to A2 and releases the lock on A2.

In a database with a conditional update in a similar situation to the above with two parallel processes that are running more or less at the same time, a sequence of example events occurring that access element A are:
 a. P1 reads A;
 b. P2 reads A;
 c. P1 calculate a new value based on A: A1;
 d. P1 calculates boundary conditions for the validity of A1: A-MIN1 and A-MAX1;
 e. P1 updates A to A1 IF A is still >=A-MIN1 and <=A-MAX1;
   i. If a boundary condition fails, then this update is aborted;
 f. P2 calculates a new value based on A: A2;
 g. P2 calculates boundary conditions for the validity of A2: A-MIN2 and A-MAX2; and
 h. P2 updates A (now really A1) to A2 IF A is still >=A-MIN2 and <=A-MAX2;
   i. The boundary conditions are tested against the value A1, even though they were calculated based on the original value of A;
   ii. If a boundary condition fails, then this update is aborted.

In some embodiments, a typical database without a conditional update processes an example of a credit card transaction, in which a husband (H) and wife (W) both have credit cards that apply to the same account, and they are out shopping in separate stores and both make purchases at approximately the same time. Beforehand, their credit card account had a balance (B) of $2300 and a credit limit (CL) of $2500. H purchases an item for $150 and W purchases an item for $75. A credit management application (APP) transactionally verifies and reserves funds for each purchase as it is made. In this situation, a sequence of example events occurring during the APP processing using a typical database are:
 a. APP opens transaction for H (TXN H) and locks and reads B=$2300 and CL=$2500;
 b. APP opens transaction for W (TXN W) and attempts to lock and read B and CL but is blocked and must wait;
 c. APP/TXN H calculates that H's purchase can be approved since CL-B>purchase price;
 d. APP/TXN H updates B=$2450;
 e. APP/TXN H commits TXN H and releases locks on B and CL and returns a success response to vendor point of sale (POS) system;
 f. APP/TXN W unblocks, then locks and reads B=$2450 and CL=$2500;
 g. APP/TXN W calculates that W's purchase cannot be approved since CL-B<purchase price; and
 h. APP/TXN W aborts TXN W and returns a failure response to vendor POS system.

In a database with a conditional update in a similar situation to the above, a sequence of example events occurring during the APP processing are:
  i. APP/TXN H reads B=$2300 and CL=$2500;
  j. APP/TXN W reads B=$2300 and CL=$2500;
  k. APP/TXN H calculates that purchase can be approved IF B remains <=$2350 at time of update;
  l. APP/TXN H updates B=(B+$150) IF B<=$2350;
  m. B currently=$2300, so condition is met and B is updated to $2450 and a success response is returned to APP/TXN H;
  n. APP/TXN H returns a success response to vendor POS system;
  o. APP/TXN W calculates that purchase can be approved IF B remains <=$2425 at time of update;
  p. APP/TXN W updates B=(B+$75) IF B<=$2425;
  q. B currently=$2450, so condition is NOT met and B is not updated and a failure response is returned to APP/TXN W; and
  r. APP/TXN W returns a failure response to vendor POS system.

The same result was achieved, but without any of the locking overhead for the traditional database system.

Figure 7:
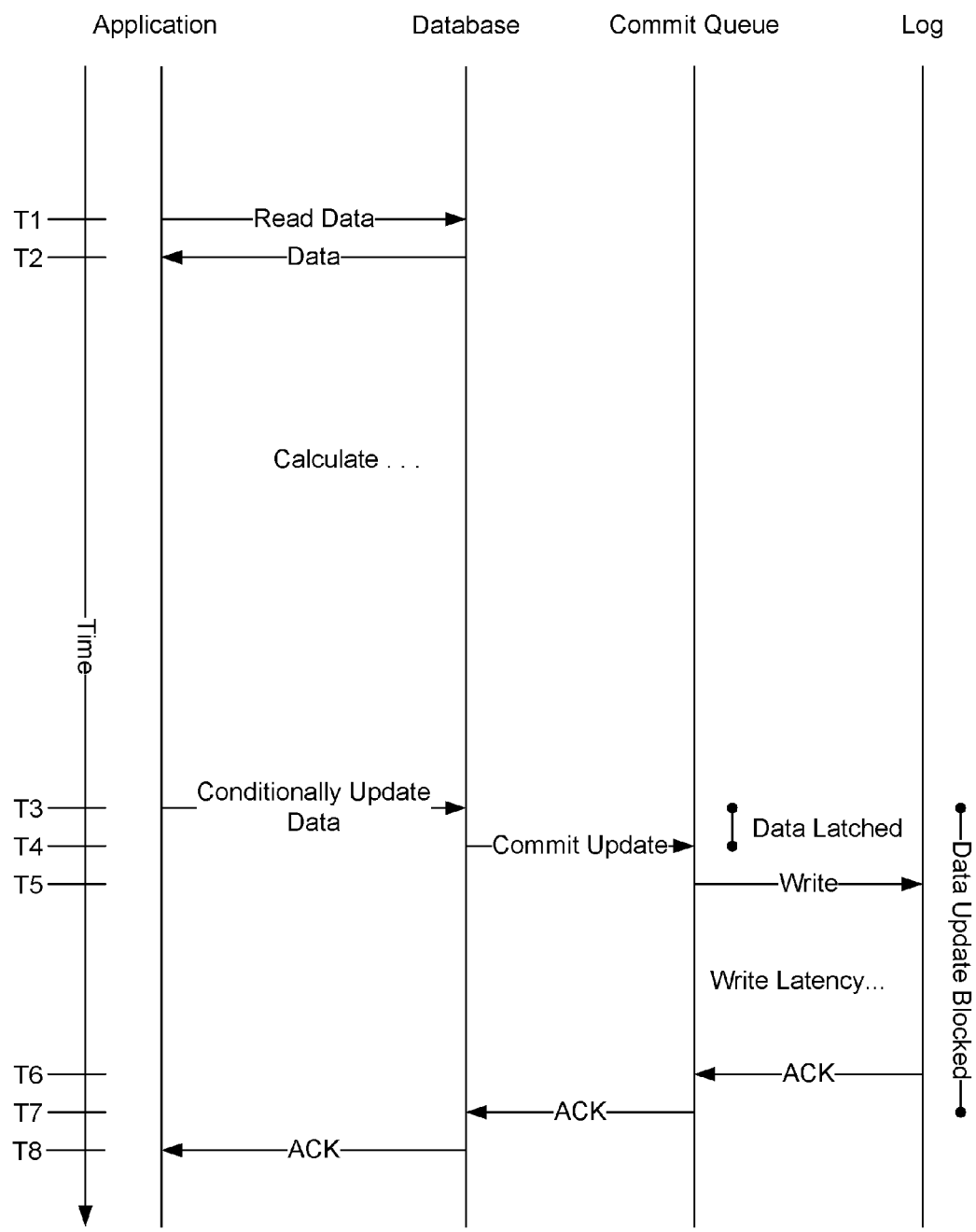
FIG. 7 is a diagram illustrating an embodiment of a queuing commit that is latched.

FIG. 7 is a diagram illustrating an embodiment of a queuing commit that is latched. In the example shown, an application of an application server (e.g., application server 102 of FIG. 1) interacts with a database of a database system (e.g., database system 100 of FIG. 1). At T1, the application sends a read data instruction to the database. At T2, the database sends data to the application. After reading data, the application spends time calculating. At T3, the application sends a conditional update data instruction to the database. At T4, the database sends a commit update instruction to the commit queue. At T5, the commit queue sends a write instruction to a log. After receiving the write instruction, the log writes the data to a memory (e.g., a magnetic hard drive or other storage device). At T6, the log sends an acknowledgement that the data has been written to a log. At T7, the commit queue sends an acknowledgement that the data has been written to a log. At T8, the database sends an acknowledgement that the data has been written to a log. During the time the database is responding to the conditional update instruction and before the commit update is sent to the commit queue, the data is latched. Latching secures exclusive access to data for an atomic region of computer instructions that contains no external communications or references, and therefore executes at full speed without waiting for completion of any external event. During the time the data base is responding to the conditional update instruction and before the commit queue acknowledges that the data has been written to a log, other updates to the data associated with the update are blocked. The block occurs because the commit conditions cannot be evaluated against the data until the previous commit finishes or fails, and it is known what value to compare to.

In some embodiments, other updates are blocked or not blocked based at least in part on whether a condition is passed for a data associated with the conditional update for a value before and/or after another conditionally committed update (e.g., some, any, or all updates in the queue). For example, in the event that a current update passes its condition with respect to all other prior queued updates, then the system may choose to not block other updates to the data associated with the update. In another example, in the event that a current update does not pass its condition with respect to all other prior queued updates, then the system may choose to fail the update without submitting the update to the commit queue.

Figure 8:
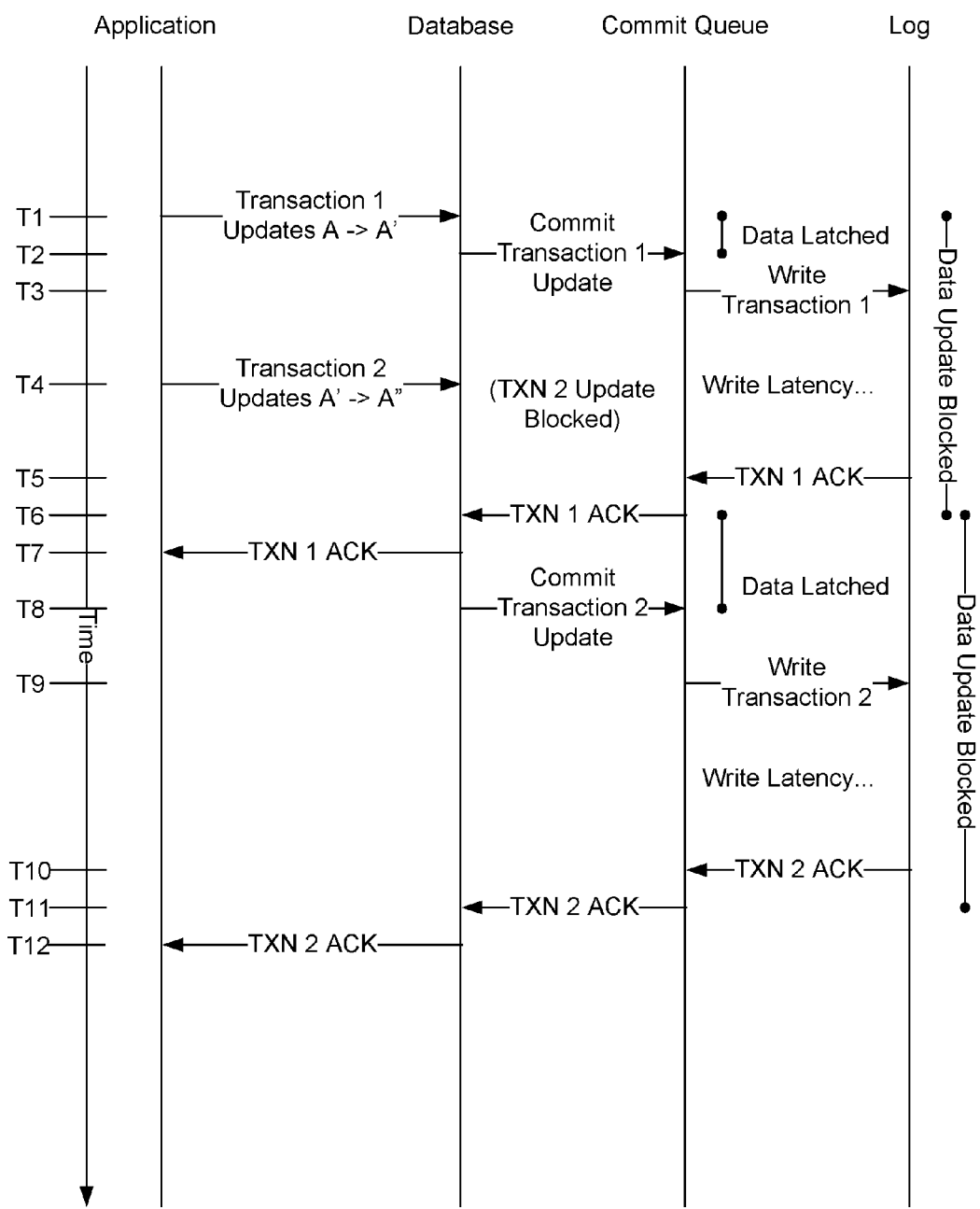
FIG. 8 is a diagram illustrating an embodiment of a queuing commit that is latched.

FIG. 8 is a diagram illustrating an embodiment of a queuing commit that is latched. In the example shown, at T1 application sends transaction 1 instruction to a database to update A to A'. At T2, database sends instruction to commit queue to commit the transaction 1 update. The data is latched from the time that the instruction is received at the database to update A to A' until the database has sent an instruction to the commit queue to commit transaction 1 update. At T3, the commit queue sends an instruction to write transaction 1 to a log. At T4, application sends transaction 2 instruction to a database to update A' to A". At T5, the log sends an acknowledgment that transaction 1 was completed. At T6, the commit queue sends an acknowledgment that transaction 1 was completed. Updates to data associated with transaction 1 are blocked from the time that the instruction is received at the database to update A to A' until an acknowledgement is received at the database that transaction 1 has been written to a log. At T7, the database sends an acknowledgment that transaction 1 was completed. The data is latched from the time that an acknowledgement is received at the data base that transaction 1 has been written to a log to the time that the database has sent an instruction to the commit queue to commit the transaction 2 update. At T8, database sends instruction to the commit queue to commit transaction 2 update. At T9, the commit queue sends an instruction to write transaction 2 to a log. At T10, the log sends an acknowledgment that transaction 2 was completed. At T11, the commit queue sends an acknowledgment that transaction 2 was completed. Updates to data associated with transaction 2 are blocked from the time that an acknowledgement is received at the data base that transaction 1 has been written to a log until an acknowledgement is received that transaction 2 has been written to a log. At T12, the database sends an acknowledgment that transaction 2 was completed.

In some embodiments, other updates are blocked or not blocked based at least in part on whether a condition is passed for a data associated with the conditional update for a value before and/or after another conditionally committed update (e.g., some, any, or all updates in the queue). For example, in the event that a current update passes its condition with respect to all other prior queued updates, then the system may choose to not block other updates to the data associated with the update. In another example, in the event that a current update does not pass its condition with respect to all other prior queued updates, then the system may choose to fail the update without submitting the update to the commit queue.

Figure 9:
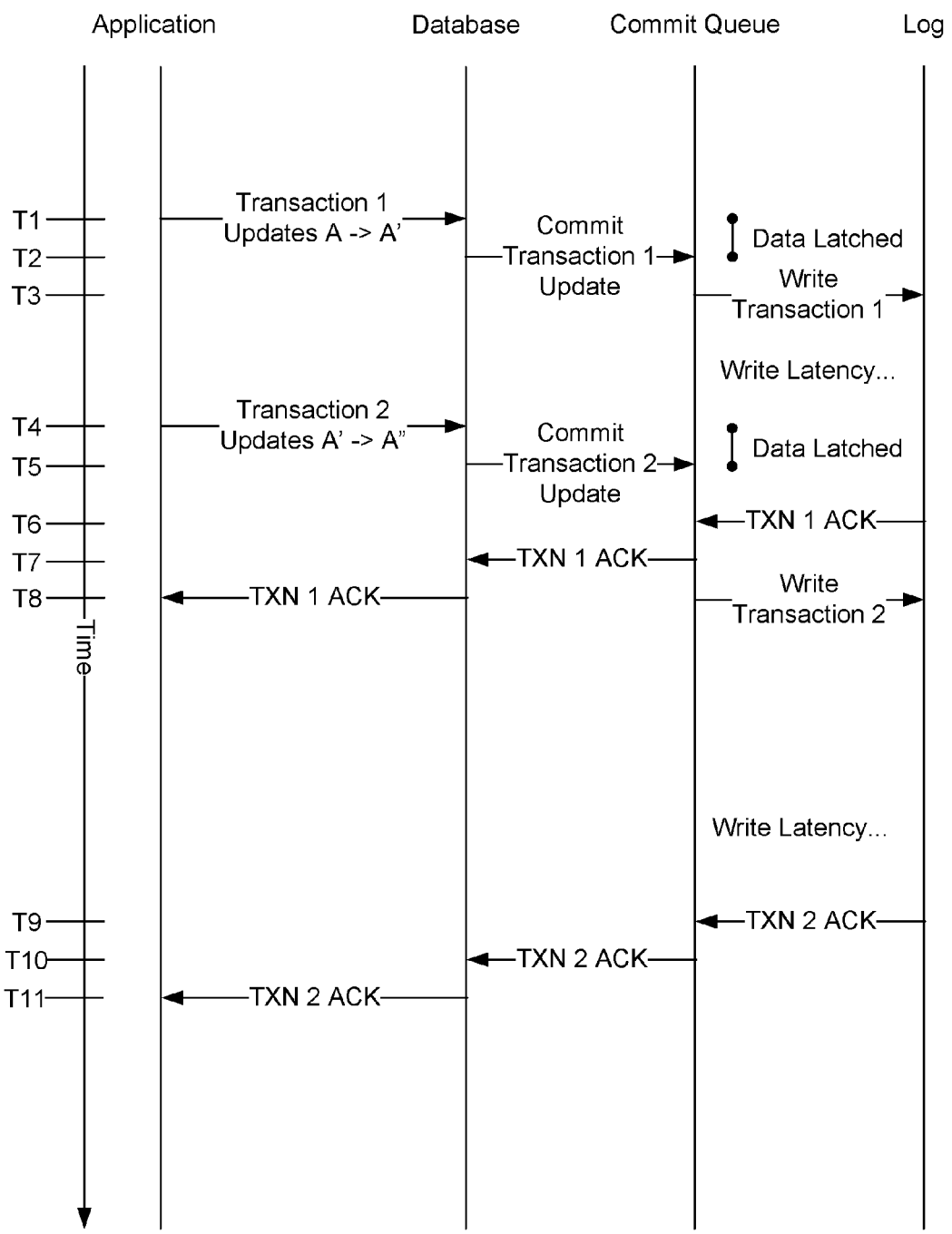
FIG. 9 is a diagram illustrating an embodiment of a queuing commit that is latched.

FIG. 9 is a diagram illustrating an embodiment of a queuing commit that is latched. In the example shown, at T1 application sends transaction 1 instruction to a database to update A to A'. At T2, database sends instruction to commit queue to commit the transaction 1 update. The data is latched from the time that the instruction is received at the database to update A to A' until the database has sent an instruction to the commit queue to commit transaction 1 update. At T3, the commit queue sends an instruction to write transaction 1 to a log. At T4, application sends transaction 2 instruction to a database to update A' to A". At T5, a commit transaction 2 update instruction is sent from the database to the commit queue. The data is latched from the time that the instruction is received at the database to update A' to A" until the database has sent an instruction to the commit queue to commit the transaction 2 update. At T6, the log sends an acknowledgment that transaction 1 was completed. At T7, the commit queue sends an acknowledgment that transaction 1 was completed. At T8, the database sends an acknowledgment that transaction 1 was completed. At T8, the commit queue sends an instruction to write transaction 2 to a log. In some embodiments, the commit queue sends the instruction to write transaction 2 to a log any time after T6 (e.g., T7). At T9, the log sends an acknowledgment that transaction 2 was completed. At T10, the commit queue sends an acknowledgment that transaction 2 was completed. At T11, the database sends an acknowledgment that transaction 2 was completed.

Figure 10:
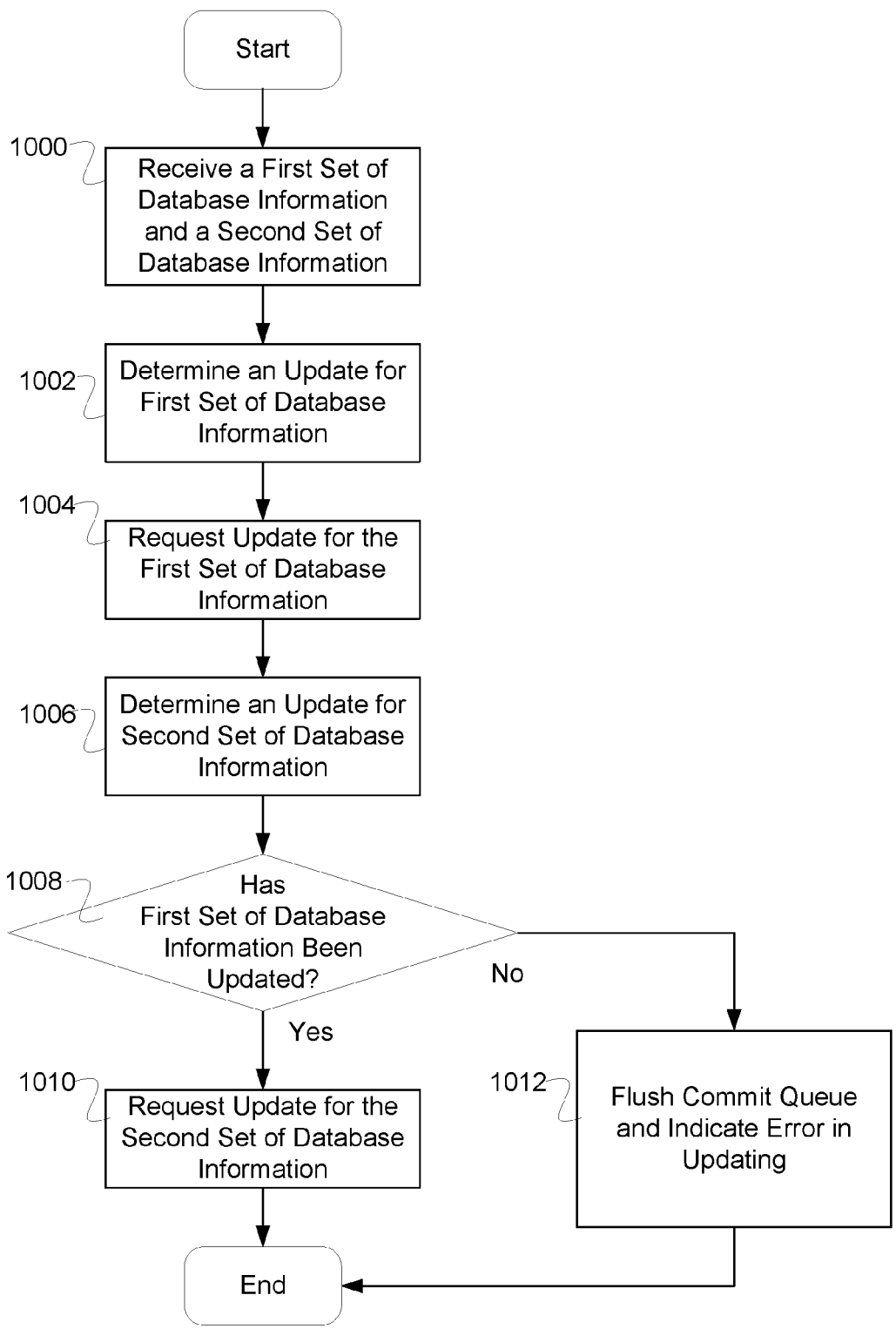
FIG. 10 is a flow diagram illustrating an embodiment of a process for conditionally logging.

FIG. 10 is a flow diagram illustrating an embodiment of a process for conditionally logging. In the example shown, in 1000 a first set of database information and a second set of database information is received. In 1002, an update for the first set of database information is determined. In 1004, an update is requested for the first set of database information. In 1006, an update for the second set of database information is determined. In 1008, it is determined whether the first set of database information has been updated. In the event that the first set of database information has been updated, in 1010 an update for the second set of database information is requested. In some embodiments, the update request submits the second set of database information to be committed to a commit queue to be written to a logging server. In the event that the first set of database information has not been updated, in 1012 the commit queue is flushed and an error in updating is indicated. In some embodiments, the error in updating is used to trigger the application to resubmit all events whose processing was associated with an update error. In some embodiments, the error in updating is due to a hardware failure (e.g., hard drive crash, log server failure, commit queue hardware failure, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A database, comprising:
an interface configured to:
receive an indication to start a first process and a second process; and
a processor configured to:
read a first value for element A for the first process;
read the first value for element A for the second process;
read a first value for element B for the second process;
calculate a first new value A1 for element A and a first new value B1 for element B for the second process;
update the first value for element A to the first new value A1 and the first value for element B to the first new value B1;
read the first new value B1 for element B for the first process;
calculate a second new value A2 for element A based at least in part on the first value for element A for the first process and a second new value B2 for element B based at least in part on the first new value B1 for element B for the first process;
update an actual value for element A to the second new value A2 in the event that the actual value for element A meets a first boundary condition to reduce database overheads in processing of the first process and the second process; and
update an actual value for element B to the second new value B2 in the event that the actual value for element B meets a second boundary condition to reduce database overheads in processing of the first process and the second process.

2. The database of claim 1, wherein the first boundary condition is based on the first value for element A.

3. The database of claim 1, wherein the second boundary condition is based on the first new value B1 for element B.

4. The database of claim 1, wherein the first boundary condition comprises a first lower bound.

5. The database of claim 1, wherein the first boundary condition comprises a first upper bound.

6. The database of claim 1, wherein the second boundary condition comprises a second lower bound.

7. The database of claim 1, wherein the second boundary condition comprises a second upper bound.

8. The database of claim 1, wherein in the event that the first value for element A does not meet the first boundary condition, the update of the actual value for element A to the second new value A2 is aborted.

9. The database of claim 1, wherein in the event that the actual value for element B does not meet the second boundary condition, the update of the actual value for element B to the second new value B2 is aborted.

10. A method for a database, comprising:
receiving an indication to start a first process and a second process; and
reading a first value for element A for the first process;
reading the first value for element A for the second process;
reading a first value for element B for the second process;
calculating, using a processor, a first new value A1 for element A and a first new value B1 for element B for the second process;
updating the first value for element A to the first new value A1 and the first value for element B to the first new value B1;
reading the first new value B1 for element B for the first process;
calculating a second new value A2 for element A based at least in part on the first value for element A for the first process and a second new value B2 for element B based at least in part on the first new value B1 for element B for the first process;
updating an actual value for element A to the second new value A2 in the event that the actual value for element A meets a first boundary condition to reduce database overheads in processing of the first process and the second process; and
updating an actual value for element B to the second new value B2 in the event that the actual value for element B meets a second boundary condition to reduce database overheads in processing of the first process and the second process.

11. The method of claim 10, wherein the first boundary condition is based on the first value for element A.

12. The method of claim 10, wherein the first boundary condition is based on the first value B1 for element B.

13. The method of claim 10, wherein the first boundary condition comprises a first lower bound.

14. The method of claim 10, wherein the first boundary condition comprises a first upper bound.

15. The method of claim 10, wherein the second boundary condition comprises a second lower bound.

16. The method of claim 10, wherein the second boundary condition comprises a second upper bound.

17. The method of claim 10, wherein in the event that the first value for element A does not meet the first boundary condition, the update of the actual value for element A to the second new value A2 is aborted.

18. The method of claim 10, wherein in the event that the actual value for element B does not meet the second boundary condition, the update of the actual value for element B to the second new value B2 is aborted.

19. A computer program product for a database, the computer program product being embodied in a non-transitory computer readable storage medium and comprising computer instructions for:

receiving an indication to start a first process and a second process; and reading a first value for element A for the first process;

reading the first value for element A for the second process;

reading a first value for element B for the second process;

calculating, using a processor, a first new value A1 for element A and a first new value B1 for element B for the second process;

updating the first value for element A to the first new value A1 and the first value for element B to the first new value B1;

reading the first new value B1 for element B for the first process;

calculating a second new value A2 for element A based at least in part on the first value for element A for the first process and a second new value B2 for element B based at least in part on the first new value B1 for element B for the first process;

updating an actual value for element A to the second new value A2 in the event that the actual value for element A meets a first boundary condition to reduce database overheads in processing of the first process and the second process; and updating an actual value for element B to the second new value B2 in the event that the actual value for element B meets a second boundary condition to reduce database overheads in processing of the first process and the second process.

\* \* \* \* \*